A method for restoring subscriber-related or terminal equipment-related information in the databank system of a mobile radiotelephone network, wherein a control means of a first communication network always communicates subscriber-related or, respectively, terminal equipment-related information to the databank system of the mobile radiotelephone network whenever a subscriber or its terminal equipment can be reached for the first time within the first communication network. The control means also communicates this information to the databank system when more than a defined time duration has elapsed since the last communication of these information.

2 Claims, 1 Drawing Sheet

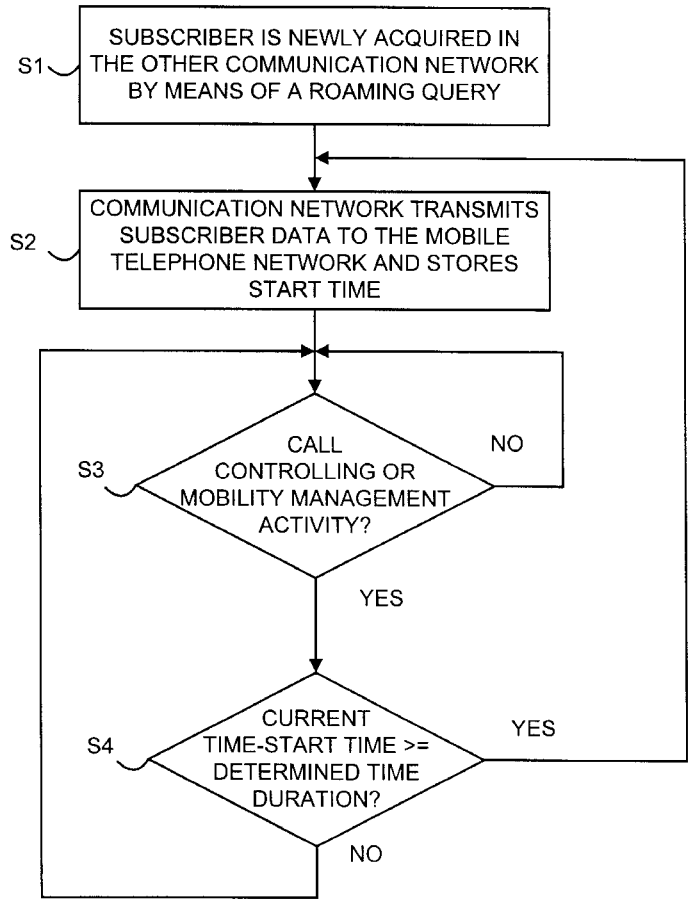

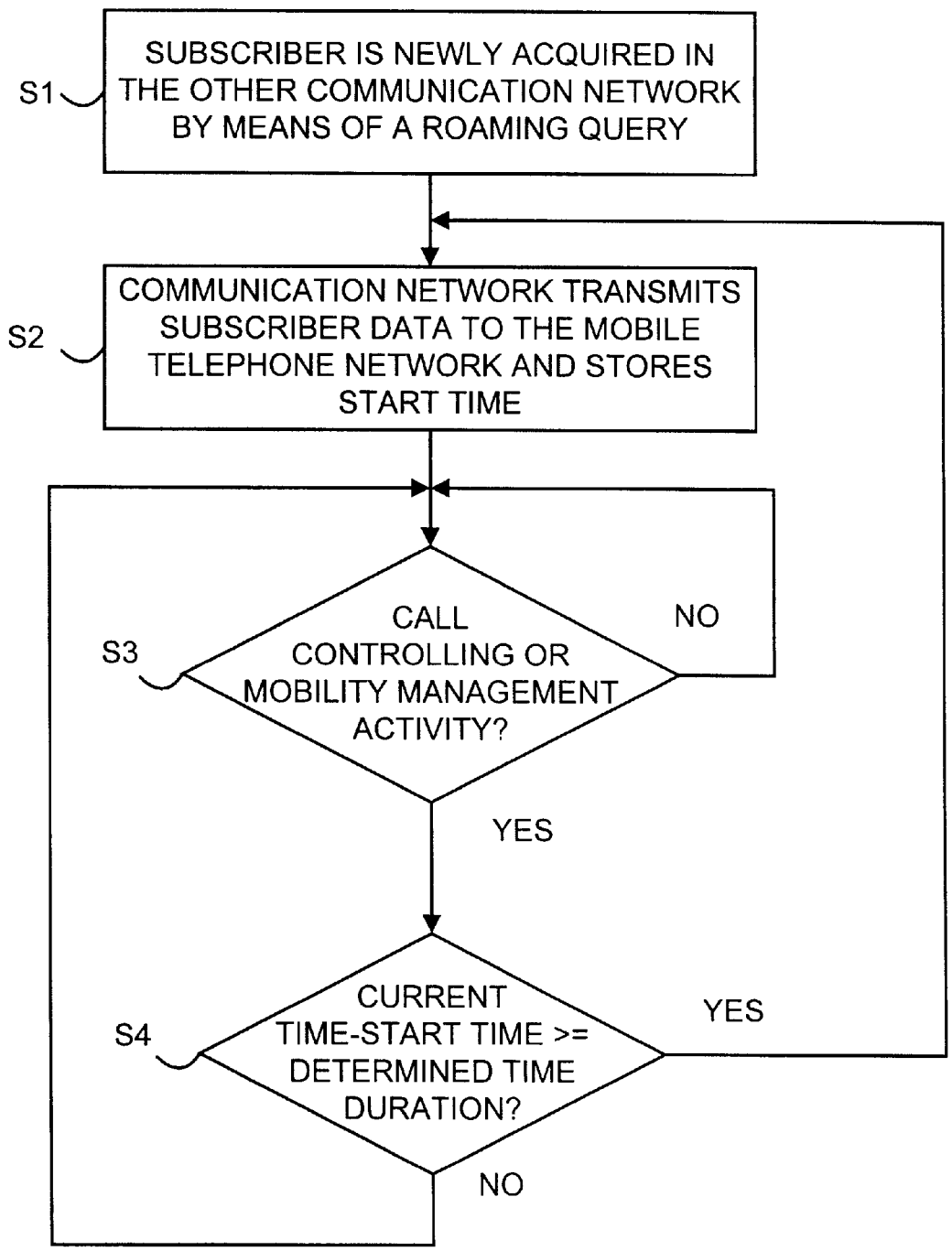

METHOD FOR RESTORING SUBSCRIBER OR TERMINAL EQUIPMENT INFORMATION IN THE DATABANK OF A MOBILE RADIOTELEPHONE NETWORK

BACKGROUND OF THE INVENTION

1. Field of the Invention

The present invention is directed generally to the filed of telecommunications, and, more particularly, the present invention is directed to a method for restoring subscriber or terminal equipment information after a fault in a databank system of a mobile radiotelephone network.

2. Description of the Related Art

In a conventional telecommunication system, wherein a subscriber or terminal equipment is reachable both via a mobile radiotelephone network as well as another communication network, information which depends on the current location of the subscriber terminal equipment-related information may have to be recovered if there is a fault in the database. For example, such subscriber, or terminal equipment-related information might be information about the current availability of a subscriber or terminal equipment or current terminal equipment-specific performance feature settings.

The book by M. Mouly, M. B. Pautet, "The GSM System for Mobile Communications", 1992, F-91120 Paliseau, at pages 470 through 473, describes updating the location database for terminal equipment in a mobile radiotelephone network as well as the restoration of subscriber or terminal equipment-related information within a database after a malfunction. Only information about the availability of a subscriber or terminal equipment within the mobile radiotelephone network are thereby stored restored. In the method disclosed herein for restoring information about the location of a terminal equipment within the mobile radiotelephone network, the uncertain, i.e. potentially incorrect information is marked as such in a first step. Other units of the mobile radiotelephone network are then apprised of the uncertain status of this information. These units also mark the corresponding information as uncertain. In order to maintain the signalling load of the communication network as low as possible, the uncertain data are only restored or, respectively, corrected when an event affecting the subscriber or the terminal equipment occurs. This may be, for example, a radio contact initialized from the terminal equipment. In order to assure such a radio contact within a specific time span, the information about the location of the subscriber or, respectively, of the terminal equipment is periodically updated. For example, this may occur once daily.

The known method, which is only applied within a mobile radiotelephone network, presumes that a unit which, for example, can offer information about the current location of a terminal equipment receives a message to the effect that the corresponding data is not correct due to a malfunction. When such a message is present, this data is updated, i.e. corrected, in case a specific action with respect to the terminal equipment arises. In order to ensure such an action within a specific time duration, it is known to initiate a periodic radio contact.

An object of the present invention is to offer a method for restoring subscriberrelated or terminal-equipment-related information after an error in a databank system of a mobile radiotelephone network for storing such information for that case wherein a subscriber or, respectively, a terminal equipment is reachable both via the mobile radiotelephone network as well as via another communication network. In such a system, information dependent on the current location of the subscriber or, respectively, terminal equipment may have to be restored.

SUMMARY OF THE INVENTION

According to the present invention, a control means in a first communication network always communicates subscriber-related or terminal equipment-related information to the databank system of a mobile radiotelephone network whenever a subscriber or terminal equipment is reachable for the first time within the first communication network. Additionally, the control means also communicates this information to the databank system when more than a specific time duration has elapsed since the last communication.

The communication of the information to the databank of the mobile radiotelephone network as soon as the subscriber or terminal equipment is reachable for the first time within the other communication system assures that the database in the databank of the mobile radiotelephone network is updated depending on occurring changes and that the database is also checked and updated regularly. This is independent of a flag about potentially existing errors.

In a specific preferred embodiment of the inventive method, the control means, given every action between the subscriber or, respectively, the terminal equipment and the other communication network, checks whether a predetermined time duration has expired since the last communication from the subscriber-related or terminal equipment-related information to the databank system of the mobile radiotelephone network.

The embodiment of the inventive method sees to it that optimally little unnecessary signalling is undertaken for restoring information in the databank system. The subscriber-related or terminal equipment-related information, are only communicated from the other communication network to the mobile radiotelephone network when an action occurs between the subscriber or, respectively, terminal equipment and the other communication network and when a specific time duration has elapsed since the last communication of said information. When no action between the subscriber or the terminal equipment and the other communication network occurs, it is assumed that there is a high probability that the subscriber cannot be reached in this communication network. Consequently, a communication of said information from this other communication network to the mobile radiotelephone network is not required at this point in time, even if the last communication occurred a longer time ago.

The invention is explained in greater detail below on the basis of an exemplary embodiment with reference to the Figure.

BRIEF DESCRIPTION OF THE DRAWINGS

FIG. 1 illustrates a flowchart for an executive sequencer of the present invention.

DETAILED DESCRIPTION OF THE PREFERRED EMBODIMENTS

FIG. 1 illustrates the flowchart of an executive sequencer for an embodiment of an inventive method for that case wherein the subscriber in the other communication network can be reached via a cordless telephone or a radiotelephone. When, in a sequence according to FIG. 1, the subscriber is newly acquired in the other communication network in the step S1 as a result of a roaming inquiry of his terminal equipment, the control means of this other communication network communicates subscriber data with subscriber-related or, respectively, terminal equipment-related information to the mobile radiotelephone network and also stores the current time as the start time. Subsequently, the control means goes to step S3 in order to check whether a call control sequence or a mobility management activity has taken place with respect to the terminal equipment or, respectively, the subscriber. When no call control sequence and no mobility control sequence takes place, then the inquiry from step S3 yields a NO and the executive sequence of the control means returns to the start of step S3. When the inquiry from step S3 yields a YES, then the executive sequence of the control means goes to step S4, in which a check is carried out to see whether the difference between the current time and the stored start time is greater than or equal to the defined time duration. When this is not the case, the control returns to the start of step S3. When, however, more than a defined time duration has elapsed since the last communication of subscriber data to the mobile radiotelephone network, i.e. the current time minus the start time stored in step S2 is greater than this defined time duration, the control returns to the start of step S2 in order to communicate subscriber data to the mobile radiotelephone network and to store the current point in time as new start time.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. A method for restoring communicator-related information after an error, in a system comprising a mobile radiotelephone network and another communication network, wherein said communicator is selected from the group consisting of a subscriber and a terminal equipment, and wherein said communicator is reachable by both said mobile radiotelephone network and said another communication network, comprising the steps of:

communicating said communicator-related information to a databank of said mobile radiotelephone network, by a controller in said another communication network, when said communicator is reachable for a first time within said another communication network; and communicating said communicator-related information to said databank when more than a specific time duration has elapsed since a last communication of said communicator-related information.

2. A method for restoring communicator-related information, in a system comprising a mobile radiotelephone network and another communication network, wherein said communicator is selected from the group consisting of a subscriber and a terminal equipment, and wherein said communicator is reachable by both said mobile radiotelephone network and said another communication network, comprising the steps of:

communicating said communicator-related information to a databank of said mobile radiotelephone network by a controller in said another communication network when said communicator is reachable for a first time within said other communication network;

checking whether a specific time duration has elapsed since a last communication of said communicator-related information to said databank upon every interaction occurrence between said communicator and said another communication network; and communicating said communicator-related information to said databank when said step of checking indicates that more than said specific time duration has elapsed since a last communication of said information.

* * * * *